United States Patent
Harmel et al.

(10) Patent No.: US 7,729,279 B2
(45) Date of Patent: Jun. 1, 2010

(54) TRAFFIC ANALYSIS ON HIGH-SPEED NETWORKS

(75) Inventors: Gautier Harmel, Paris (FR); Eric Horlait, Amiens (FR); Jerome Tollet, Paris (FR)

(73) Assignee: QOSMOS, Amiens (FR)

( * ) Notice: Subject to any disclaimer, the term of this patent is extended or adjusted under 35 U.S.C. 154(b) by 90 days.

(21) Appl. No.: 11/914,058

(22) PCT Filed: May 12, 2006

(86) PCT No.: PCT/EP2006/005329

§ 371 (c)(1),
(2), (4) Date: Mar. 6, 2008

(87) PCT Pub. No.: WO2006/120040

PCT Pub. Date: Nov. 16, 2006

(65) Prior Publication Data

US 2008/0198759 A1    Aug. 21, 2008

(30) Foreign Application Priority Data

May 13, 2005   (EP) .................................. 05291044

(51) Int. Cl.
*H04L 12/26*   (2006.01)
(52) U.S. Cl. ................... 370/252; 370/241; 370/248; 709/224
(58) Field of Classification Search .............. 370/252, 370/241, 248, 392; 709/224
See application file for complete search history.

(56) References Cited

U.S. PATENT DOCUMENTS

| | | | | |
|---|---|---|---|---|
| 5,590,116 A | * | 12/1996 | Zhang | 370/253 |
| 7,203,173 B2 | * | 4/2007 | Bonney et al. | 370/242 |
| 7,539,749 B2 | * | 5/2009 | Schweitzer et al. | 709/224 |
| 2002/0161881 A1 | * | 10/2002 | Perkinson et al. | 709/224 |
| 2002/0176448 A1 | * | 11/2002 | Sikdar | 370/503 |
| 2004/0047594 A1 | * | 3/2004 | Towler | 386/46 |
| 2005/0083935 A1 | * | 4/2005 | Kounavis et al. | 370/392 |
| 2006/0168205 A1 | * | 7/2006 | Barron et al. | 709/224 |

OTHER PUBLICATIONS

Chen et al. "A Two-Stage Packet Classification Algorithm", *Proceedings of the 17th Int'l Conference on Advanced Information Networking and Applications*, 2003, pp. 762-767, XP-002333339.

* cited by examiner

*Primary Examiner*—Ricky Ngo
*Assistant Examiner*—Rasheed Gidado
(74) *Attorney, Agent, or Firm*—Occhiuti Rohlicek & Tsao LLP

(57) ABSTRACT

The present invention provides a traffic analyzing system on a communications link having analyzer circuits connected to each other by a number of links, where each analyzer circuit has a data rate lower than the data rate of the communications link, and are adapted to perform respective different levels of analysis on packets. The information extracted from the packets analyzed at a first level of analysis by a first analyzer circuit is forwarded to a second level of analysis performed at a second analyzer circuit, where the additional analysis performed by the second analyzer circuit depends on the analysis performed by the first analyzer circuit. Such a system and associated method allows for an efficient, practical, and improved traffic flow analyses for computer networks to evaluate high-speed and heavy traffic flow, as well as for improved protocol analysis for emerging technologies.

11 Claims, 1 Drawing Sheet

TRAFFIC ANALYSIS ON HIGH-SPEED NETWORKS

TECHNICAL FIELD

The present invention relates to computer networks, and in particular, to traffic flow analysis on high-speed connection links.

BACKGROUND

Investigating traffic flow can take a lot of processing time and power to monitor and classify, and both the amount and speed of traffic data, especially Internet traffic data, are ferociously increasing. Systems for traffic flow analysis very often encounter several obstacles, which take place at the level of the traffic flow passage due to various types of heavy processing required in order to obtain a semantic, reliable, and useful classification and processing of network traffic.

Classification of traffic travelling around a data network makes it possible to decide on behaviours to be adopted for each traffic flow as a function of its classification. That is, before a data packet can be adequately processed, classification of the traffic flow permits the network components to classify the data packets according to the various characteristics of the packets and information contained in the packet. Thus, accurate and efficient data processing depends largely on reliable methods of packet classification. After the packet is classified, the network components can determine how to properly handle and process the packets.

For example, in a firewall, a security system setup generally relies on recognition of protocol properties to prevent certain transfers, and in devices for managing quality of service, such devices allocate priorities to data as a function of complex rules which describe various scenarios. A correspondence between these scenarios and data packets conveyed within connections uses techniques for classifying these connections.

Again, the operations for controlling and managing networks require classification of connections between various senders and receivers which generate digital data streams over these networks. This requires powerful and reliable methods of classification, and thus traffic analysis.

Furthermore, analysis and classification of packets often involve the complex task of constructing protocol attributes, i.e., determining the ordered sequence of protocol names used in the semantic stream of data and the parameter names carried by a protocol. Building such a graph or knowledge base to recognize different protocols is a very heavy task because of the increasing numbers of new protocols used in packet communication networks, as well as the number of protocol modifications and new dependency links.

Typically, a data packet observation task is assigned to a node of the network such as, for example, a proxy server where connections pass through, which generate these data packets. Thus, existing traffic flow analyses are generally performed in computer networked systems such as the one illustrated in FIG. 1. A traffic analyzing system for analyzing high-speed traffic (e.g., packets or datagrams) between various computers, includes a first network 100 connected to a second network 110 using a communications link 200. The link 200 is analyzed by an analyzer 300, which measures and analyzes the traffic flowing in both or either direction between the first network 100 and the second network 110. The traffic between the network 100 and network 110 is usually 1 Gbps in business networks but can be as high as a couple dozen Gbps in the core of an operator's network.

As mentioned above, in heavily trafficked networks, to continuously analyze all traffic in an accurate and precise manner is a tall order. The capacity for analysis and measurement of the analyzer 300 is determined by the number of simultaneous flows N (e.g., traffic flow size) and the throughput T of each flow (e.g., traffic flow speed). N directly affects the amount of memory required to manage the context of the registered applications, whereas T directly impacts the processing power required to perform the analysis without significant loss of packets. T defines the quantity of packets to be processed in a lapse of time and defines, as a result, the amount of processing that can be allocated to each packet.

In known systems, the amount of processing increases proportionally with the increase of the flow N, insofar as each packet contributes to the state of a flow and thus imposes a structure of data whose size is related to N. It is thus clear that a given material infrastructure will present a behaviour related to its intrinsic performance and configuration, which will make it possible either to increase N by decreasing D, or to increase D by decreasing N. In other words, N×D remains nearly constant.

However, the reality and progression of existing computer networks is that N and T are both increasing proportionally at the same time. That is, the size and the speed of the network traffic are no longer inversely proportional, but both N and T are increasing. Added to this is the vastness and complexity of the traffic flow left to monitor and analyze.

Therefore, it would be desirable to develop a new method and system to perform efficient, practical, and improved traffic flow analyses for computer networks to evaluate high-speed and heavy traffic flow, as well as perform improved protocol analysis for emerging technologies such as, for example, VoIP (Voice over IP) applications.

SUMMARY OF THE INVENTION

Accordingly, it is an object of the invention to provide a traffic analyzing system for traffic analysis on a communications link, having analyzer circuits connected to each other by a number of links, where each analyzer circuit has a data rate lower than the data rate of the communications link, and they are adapted to perform respective different levels of analysis on packets. The information extracted from the packets analyzed at a first level of analysis by a first analyzer circuit is forwarded to a second level of analysis performed at a second analyzer circuit, and the additional analysis performed by the second analyzer circuit depends on the analysis performed by the first analyzer circuit.

One or more of the following features may also be included.

In one aspect of the invention, the first and second analyzer circuits adapted for performing respective different levels of analysis include a common memory for receiving state information provided by the analysis performed by the first and second analyzer circuits.

In another aspect, the first and second analyzer circuits adapted for performing respective different levels of analysis include lower and higher level analyzer circuits, respectively, where the lower level analyzer circuit is adapted to perform an explicit level of analysis, while the higher level analyzer circuit is adapted to perform an implicit level of analysis.

In yet another aspect, the explicit level of analysis is adapted to recognize protocols for which the packet header sufficiently identifies useful information to formulate a packet signature.

Moreover, the invention also provides a method for examining network traffic flow by performing analysis of packets on a communications link connecting various networks, where the method sets successive levels of analysis within a traffic analyzing system having analyzer circuits adapted for performing respective different levels of analysis at different layers, and the analyzer circuits are connected to each other by links, each of which has a data rate lower than a data rate of the communications link. The method also forwards the packets analyzed by the analyzer circuits, where information extracted from the packets analyzed at a first level of analysis by a first analyzer circuit is forwarded to a second level of analysis performed at a second analyzer circuit, and so forth, and the method uses the analysis performed by the first analyzer circuit for the analysis performed by the subsequent second analyzer circuit.

Other features of the invention are further recited in the dependent claims.

These and other aspects of the improved system and method will be apparent from the following description, drawings, and from the claims.

DETAILED DESCRIPTION

Figure 1:
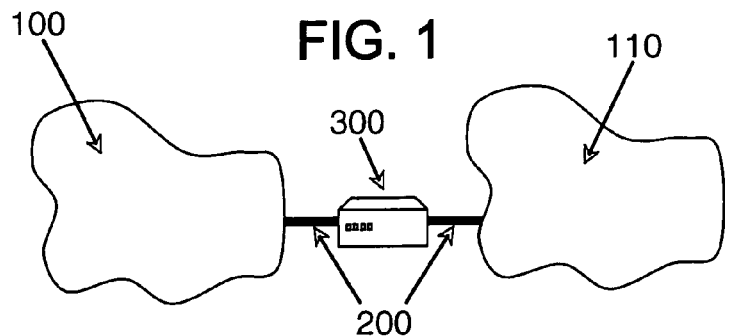
FIG. 1 is a schematic diagram of a typical traffic analyzing system.
Figure 2:
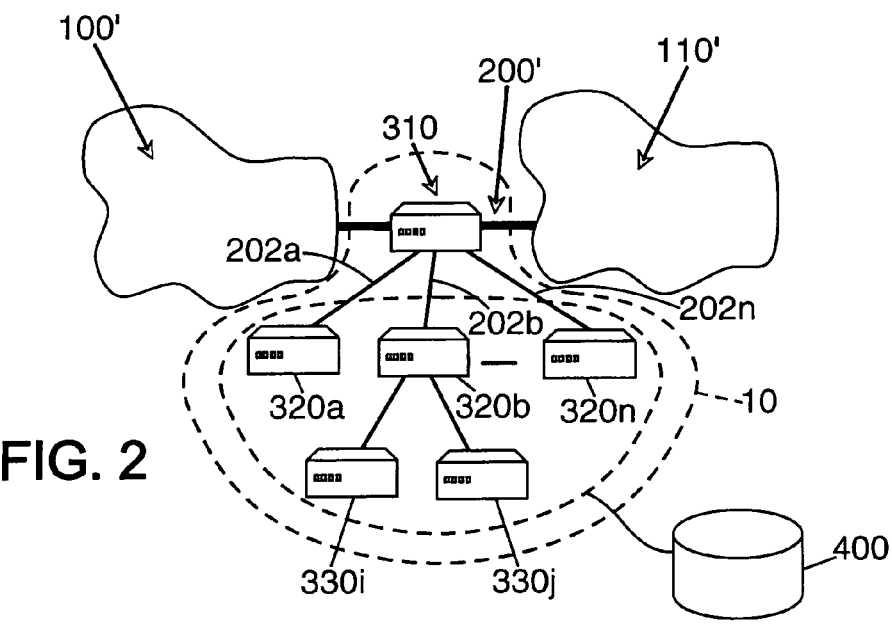
FIG. 2 is a schematic diagram of a first implementation according to the present invention.

Referring to FIG. 2, a traffic analyzing system 10 includes a hierarchical analyzer 310 which replaces the analyzer 300 of the traffic analyzing system of FIG. 1.

The hierarchical analyzer 310 defines successive layers of analysis for the traffic flow passing through a communications link 200' between a first network 100' and a second network 110'. As a result, the hierarchical analyzer 310 performs a first level of analysis on the traffic flow, a second level of analysis is performed by analyzers 320a-320n, and a third level of analysis is performed by analyzers 330i-330j. The traffic analyzing system 10 can have as many levels of analyzers as necessary to adequately analyze and classify the traffic depending on the flow size and speed of packets on the communications link 200'.

The hierarchical analyzer 310 and the analyzers 320a-320n are connected by links 202a-202n, and the number of packets passing through the communications link 200' is greater than the number of packets passing through the links 202a-202n.

For example, in the first level of analysis, the hierarchical analyzer 310 performs a first level of classification, that is, performs the first operations to classify the packets according to the type of packets, header identification, and the like. Also, the hierarchical analyzer 310 can perform an explicit type of protocol analysis such as pattern recognition techniques or pattern matching.

Among such explicit protocols is the Ethernet protocol, where an Ethernet packet header specifies whether the following protocol in the protocol stack is, for example, a LLC protocol or an IP protocol possibly together with its version. Likewise, the packet header under IP protocol specifies whether the following protocol in the protocol stack is a TCP, UDP, or ICMP Protocol. Although the first level of analysis could pertain to explicit types of protocol analyses, it is not necessarily limited thereto.

Once the first level of analysis performed at the lower level is performed by the hierarchical analyzer 310, the second level analyzers, namely, analyzers 320a-320n, can further examine the packets according to the prior classification made by the first level hierarchical analyzer 310. In other words, analyzers 320a-320n will perform an implicit type of analysis at higher levels, meaning, recognizing the presence of implicit protocols. A protocol is said to be implicit when it is not readily identifiable in a definite manner by a protocol header which precedes this protocol in the protocol stack. Such is the case for numerous application levels protocols such as Pointcast or Kazaa, use of which in the protocol stack of a connection, depends on their connections context generally established by prior negotiations, that are difficult to compile with real-time scanning along the flow of the packets travelling around the connection. For example, certain known protocols such as the HTTP, Telnet, FTP protocols are at the limit of explicit and implicit protocols. These protocols may be regarded as explicit when a reserved port number figuring in a TCP protocol header gives a destination indicator which makes it possible to identify in a definite manner the protocol which is transported, for example, a number 80 corresponding to the HTTP protocol, a number 23 corresponding to the Telnet protocol, a number 21 corresponding to the FTP protocol. A client station uses, for example, under TCP, the port number 80 to establish an HTTP query connection with a server station by allotting a dynamic port number to a peer connection which allows the server station to respond to the client station. The explicit nature of the HTTP protocol over the peer connection for conveying the responses of the server station to the client station, is lessened through the dynamic allocation of a port number, related to the context of the query connection. Moreover, nothing prevents a client station from negotiating beforehand with the server station, a port number distinct from the number 80 for the HTTP query connection. In this case, the HTTP protocol is more implicit than explicit. This remains true for other protocols and the technology is able to cope with this situation.

Thereafter, the second level of analysis enriches the knowledge provided by first level of analysis, and so on. Subsequently, adding additional levels of analysis such as the third level analyzers 330i-330j, the analyzers 330i-330j use the analysis performed in the precedent second level of analysis and enrich the precedent level with additional analysis of their own.

Furthermore, as another example of a first level of analysis, we can imagine a first level of analysis performed by the first level hierarchical analyzer 310 by calculating a hash key on IP source, IP destination addresses, transport code, source port and destination port, and forwarding the packets to analyzers 320a-320n for a second level of analysis where a classification is made using the application ports, leaving to the analyzers 330i-330j the task of performing a third level of classification pertaining to the semantic recognition of the traffic flow. For example, a semantic recognition of the flow may involve using a protocol graph and a modular self-identifying mechanism associated with the protocol to obtain important packet elements from the traffic, as described in WO 2004/017595.

Still referring to FIG. 2, all the analyzers of the traffic analyzing system 10 may share a common memory 400 that stores the state information related to the performed analyses. For example, in the scenario described above, it would be necessary for the analyzers 320a-320n and the analyzers 330i-330j to share the common memory 400. In fact, it would be necessary that the analyzers 310, 320a-320n, and 330i-330j and all analyzers from different, subsequent levels share the same memory 400. One example is when the split of the analytical task rely on usage statistics of resources from each sensor.

Figure 3:
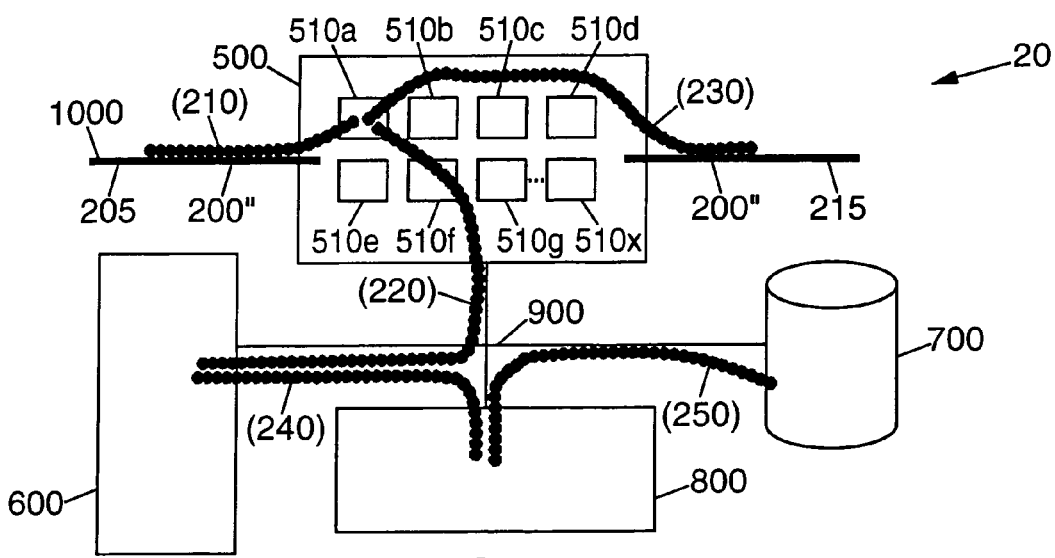
FIG. 3 is a schematic diagram of another implementation of the present invention.

Referring now to FIG. 3, another traffic analyzing system 20 is represented where a hierarchical level of analysis is implemented using independent processing units, either by combining several CPUs such as PC computers, by using parallel processing architecture, for instance, network processors, or more globally, by using any other type of mechanism allowing the organization of successive layers of analysis and sharing of related data.

FIG. 3 shows bidirectional data traffic on a communication link 200" passing through a network processor 500 aggregating elementary processors 510a-510x, connected to a memory 600, a storage module 700, and a traditional microprocessor 800 via a high performance communication bus 900.

As further illustrated in FIG. 3, when analyzing the bidirectional data traffic for hierarchical analysis, the communications link 200" receive incoming packets 1000 at its incoming end 205. These incoming packets 1000 are first analyzed by one of the elementary processors 510a-510x in a step (210). The incoming packets 1000 are then copied into the memory 600 in a step (220). For example, if necessary, the incoming packets 1000 are then duplicated to the communication link 200" at its outputting end 215 in a step (230). This is the case when passive analysis is performed for monitoring purposes, for example, but is not the case with other applications such as firewall applications. In parallel, the same steps are carried for the other packets. Then, the packets 1000 stored in the memory 600 are processed by the traditional microprocessor 800 in a step (240), which will analyze the packets and write the state information into the storage module 700 in a step (250). This part of the analysis does not involve all the packets, but only a portion of them. In addition, analyzing all the incoming packets 1000 can be done in parallel and independently from the copying and duplication as well as the processing of the packets using the traditional microprocessor 800.

As an example, the traditional microprocessor 800 may perform analyses pertaining to analyzing different protocols and analyzing the packets in the context of different protocols, e.g., implicit vs. explicit protocols, in order to rapidly identify the packets and extract useful semantic information on the traffic flow, such as classification of a network connection by progressive construction of an ordered sequence of the used protocols.

The invention claimed is:

1. A traffic analyzing system for performing traffic analysis of packets on a communications link connecting a plurality of networks, the system comprising:
a plurality of analyzer circuits connected to each other by a plurality of links, each of which has a data rate lower than a data rate of said communications link; and
wherein the analyzer circuits are configured for performing different levels of analysis on packets travelling along said communications link,
wherein information extracted from the packets analyzed at a first level of analysis by a first analyzer circuit is forwarded to a second level of analysis performed at a second analyzer circuit, the second level comprising at least two analyzers arranged to perform parallel analysis, and wherein the additional analysis performed by the second analyzer circuit depends on the analysis performed by the first analyzer circuit,
wherein the first and second analyzer circuits configured for performing respective different levels of analysis comprise lower and higher level analyzer circuits, respectively,
wherein the lower level analyzer circuit is configured to perform an explicit level of analysis, while the higher level analyzer circuit is configured to perform an implicit level of analysis,
wherein the implicit level of analysis comprises recognizing the presence of a protocol, which is not readily identifiable in a definite manner by a protocol header, which precedes this protocol in a protocol stack, wherein the explicit level of analysis comprises recognizing the presence of a protocol, which is readily identifiable in a definite manner by a protocol header, which precedes this protocol in the protocol stack.

2. The system according to claim 1, wherein the first and second analyzer circuits configured for performing respective different levels of analysis comprise a common memory for receiving state information provided by the analysis performed by the first and second analyzer circuits.

3. The system according to claim 1, wherein the explicit level of analysis is configured to recognize protocols for which the packet header sufficiently identifies useful information to formulate a packet signature.

4. The system according to claim 1, further comprising a network processor aggregating elementary processors; a memory; and a storage module, connected via a communication bus.

5. The system of claim 4, wherein the network processor comprises a parallel processing architecture.

6. A method for examining network traffic flow by performing analysis of packets on a communications link connecting a plurality of networks, wherein the method comprises:
setting successive levels of analysis within a traffic analyzing system comprising a plurality of analyzer circuits, each of which is configured for performing a different level of analysis at a different layer, wherein a plurality of analyzer circuits are connected to each other by a plurality of links, each of which has a data rate lower than a data rate of said communications link;
forwarding the packets analyzed by the plurality of analyzer circuits, wherein information extracted from the packets analyzed at a first level of analysis by a first analyzer circuit is forwarded to a second level of analysis performed at a second analyzer circuit, the second level comprising at least two analyzers arranged to perform parallel analysis, and so forth; and
using the analysis performed by the first analyzer circuit for the analysis performed by the second analyzer circuit, wherein the first and second analyzer circuits are configured for performing respective different levels of analysis comprise lower and higher level analyzer circuits, respectively, wherein the lower level analyzer circuit is configured to perform an explicit level of analysis, while the higher level analyzer circuit is configured to perform an implicit level of analysis, wherein the implicit level of analysis comprises recognizing the presence of a protocol, which is not readily identifiable in a definite manner by a protocol header, which precedes this protocol in a protocol stack, whereas the explicit level of analysis comprises recognizing the presence of a protocol, which is readily identifiable in a definite manner by a protocol header, which precedes this protocol in the protocol stack.

7. The method of claim 6, wherein setting successive levels of analysis comprises defining the first level of analysis performed by the first level analyzer circuit by classifying the packets by hash coding their source address or signature and forwarding the classified packets to the second level analyzer circuit in the second level of analysis.

8. The method of claim 6, wherein the method further comprises providing a semantic recognition of the traffic flow based on the analysis performed by the first and second levels of analysis.

9. The method of claim 7, further comprising:
analyzing incoming packets arriving at an incoming end of the communications link, by at least one of the elementary processors;
copying the packets into a memory; and
processing the packets stored in the memory using a processor for analyzing the packets and writing the state information into a storage module; and
performing the analysis for all the incoming packets in parallel and independently from the copying, duplicating, and processing steps.

10. The method of claim 9, wherein the network microprocessor comprises a parallel processing architecture.

11. The method of claims 9, wherein the method further comprises duplicating the packets to an output link of the communication link.

* * * * *